(12) United States Patent
Pecard et al.

(10) Patent No.: US 9,906,906 B1
(45) Date of Patent: *Feb. 27, 2018

(54) INTEGRATED GEOSPATIAL ACTIVITY REPORTING

(71) Applicant: CARS.COM, LLC, Chicago, IL (US)

(72) Inventors: Jennifer Lou Chae Pecard, Chicago, IL (US); Guy Jeffrey Bloomfield, Winfield, IL (US); Benjamin Mitchell Cohen, Chicago, IL (US); Ramesh Jankampet, Aurora, IL (US)

(73) Assignee: CARS.COM, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,813

(22) Filed: Aug. 21, 2017

Related U.S. Application Data

(63) Continuation of application No. 15/615,071, filed on Jun. 6, 2017, now Pat. No. 9,743,236, which is a continuation of application No. 15/280,914, filed on Sep. 29, 2016, now Pat. No. 9,686,646.

(51) Int. Cl.
*H04W 4/02* (2009.01)
*H04W 4/04* (2009.01)
*G01S 19/13* (2010.01)

(52) U.S. Cl.
CPC ............ *H04W 4/021* (2013.01); *G01S 19/13* (2013.01); *H04W 4/04* (2013.01); *H04M 2250/10* (2013.01)

(58) Field of Classification Search
CPC ......... H04W 4/04; H04W 4/02; H04W 12/08; H04W 4/021; H04W 4/027; H04W 64/00; H04W 4/023; H04W 4/025; H04W 4/046
See application file for complete search history.

(56) References Cited

U.S. PATENT DOCUMENTS

| 8,081,072 | B2 | 12/2011 | Scalisi et al. |
| 8,471,701 | B2 | 6/2013 | Yariv et al. |
| 8,531,293 | B2* | 9/2013 | Putz .................. G08B 31/00 340/435 |
| 9,686,646 | B1* | 6/2017 | Pecard ................ H04W 4/021 |
| 9,743,236 | B1 | 8/2017 | Pecard et al. |
| 2002/0065707 | A1* | 5/2002 | Lancaster ............ G06Q 30/02 705/14.49 |
| 2009/0248663 | A1 | 10/2009 | Maniyar et al. |

(Continued)

*Primary Examiner* — Quan M Hua
(74) *Attorney, Agent, or Firm* — Marshall, Gerstein & Borun LLP

(57) ABSTRACT

Systems and methods for distinguishing between user mobile device location data indicating user locations within an area of interest or merely near an area of interest are disclosed. User geospatial location data is obtained at user mobile devices (e.g., smartphones) upon the triggering event of a user action (e.g., visiting a web site or using an application on the user mobile device). The location data is stored and compared against polygonal map data accurately and precisely defining a map area of the area of interest. A map view may be generated by generating markers having different styles for user location data within or near the area of interest, which markers may then be overlaid on a map including a polygon representation of the area of interest. Such map view may be augmented by additional data and presented as a report including location and additional data for a plurality of users.

20 Claims, 7 Drawing Sheets

(56) References Cited

U.S. PATENT DOCUMENTS

| | | | |
|---|---|---|---|
| 2010/0042940 A1* | 2/2010 | Monday | G06F 3/0486 |
| | | | 715/764 |
| 2010/0203901 A1 | 8/2010 | Dinoff et al. | |
| 2011/0178811 A1* | 7/2011 | Sheridan | G01C 21/362 |
| | | | 705/1.1 |
| 2014/0046802 A1 | 2/2014 | Hosein et al. | |
| 2014/0207571 A1* | 7/2014 | Hammock | G06Q 30/0255 |
| | | | 705/14.53 |

* cited by examiner

INTEGRATED GEOSPATIAL ACTIVITY REPORTING

CROSS-REFERENCE TO RELATED APPLICATIONS

This application is a continuation of U.S. patent application Ser. No. 15/615,071, filed on Jun. 6, 2017, which is a continuation of U.S. patent application Ser. No. 15/280,914 (U.S. Pat. No. 9,686,646), filed on Sep. 29, 2016, the entirety of which are incorporated herein by reference.

TECHNICAL FIELD

The present disclosure generally relates to a system and a method for accurately generating map representations of user mobile device locations capable of distinguishing between user locations within or near an area of interest.

BACKGROUND

With the growth in mobile data access through smartphones and similar devices, mobile device users who visit locations frequently search information regarding such locations or other complementary or competing locations while actually at a location. This new type of data provides opportunities to customize visitor experiences or to predict visitor behavior. Geospatial location data is routinely generated by mobile devices using various terrestrial and satellite methods, such as cellular network tower triangulation, wireless node identification, or Global Positioning System (GPS) location determination techniques. These techniques can vary significantly in their accuracy, with GPS techniques usually providing the greatest degree of accuracy but consuming the most power.

Additionally, a variety of computer-implemented mapping techniques have been developed to plot geospatial coordinates against known landmarks on electronic maps. These techniques typically define a location by a point coordinate and a radius, such that any observed geospatial location data within a circular area around the point coordinate are considered to be at the location. Very few areas of interest in the world are actually circular, however, resulting in false positives or false negatives when determining whether an observed geospatial location from a mobile device is at the location. In some situations, a low degree of accuracy is sufficient, such as where visitors are unlikely to be near the location for other purposes. For example, a shopping mall surrounded by a large parking lot on all sides may be adequately described by a point coordinate and radius because any mobile device users in the parking lot may be assumed to be at such location in order to visit the shopping mall. In situations where mobile device users may be near the area of interest for unrelated reasons or where competing locations may be in close proximity, it becomes useful to distinguish between actual visitors to the area of interest and other mobile device users who are merely nearby. Comparing mobile device geospatial location data against point coordinates based upon simple distance measurements is insufficient for such situations. The inventive concepts described herein are directed to distinguishing between mobile device users within an area of interest and mobile device users near but not within the area of interest.

SUMMARY

The present application discloses a method, system, and computer-readable medium storing instructions for distinguishing between mobile device geospatial location data indicating a user is located within an area of interest and mobile device geospatial location data indicating a user is merely near (but not within) the area of interest. Specifically, the method, system, and instructions determine where the location data is within a polygonal area representing the area of interest. Such areas of interest may be vehicle dealer lots, and additional data relating to mobile device users may be combined with the location data to generate maps and reports associated with such vehicle dealer lots.

The method, system, or instructions may include receiving a request from a user for information associated with one or more vehicles or vehicle dealers, which request may be; obtaining a geospatial location identifier of the user device identifying a geospatial location of the user device at a time associated with the request; transmitting the geospatial location identifier and an indication of the request from the user mobile device to a server via a communication network; receiving the geospatial location identifier and the indication of the request at the server via the communication network; accessing map data associated with a vehicle dealer lot in proximity to the identified geospatial location of the user device from a memory associated with the server, the map data including a set of data defining a lot area of the vehicle dealer lot as one or more polygons within a map area; determining that the user mobile device is located on the vehicle dealer lot by comparing the geospatial location identifier with the lot area; generating map view data based upon the map data and the geospatial location identifier by overlaying a user device marker associated with the user on a representation of a map including the lot area; and/or causing the generated map view data to be presented to an operator of the computing device.

The request may be received at or from a user mobile device, which may be a smartphone. The geospatial location identifier may be obtained or generated by a geolocation unit of the mobile device, such as a Global Positioning System (GPS) coordinate determined by a GPS unit of the user mobile device.

The user device marker may indicate the geospatial location of the user mobile device or may indicate other locations associated with the user mobile device or actions of the user. In some embodiments, the indication of the request may include additional data regarding one or more of: the user, interaction of the user with the mobile device, or a duration of the user mobile device at the geospatial location. In such embodiments, the user device marker may be associated with the additional information, and the additional information may be presented to the operator upon selection of the user device marker by the operator.

The representation of the map may include a visual representation of the lot area by displaying a representation of the set of one or more polygons. Causing the generated map view data to be presented to the operator may include transmitting the map view data to the computing device for presentation via the network.

Yet further embodiments may include: receiving a plurality of additional geospatial location identifiers and a plurality of additional indications of requests for information, wherein each of the plurality of additional geospatial location identifiers is associated with one of the plurality of additional indications of requests for information and is further associated with one of a plurality of additional users; determining a set of users from the plurality of additional users, wherein each member of the set of users is associated with at least one of the plurality of additional geospatial location identifiers corresponding to a geospatial location within the lot area based upon a comparison of the plurality of additional geospatial location identifiers with the one or more polygons; determining a set of additional vehicle dealer lots associated with the set of users, wherein each entry in the set of additional vehicle dealer lots is associated with at least one of the following: (i) one of the plurality of additional geospatial location identifiers or (ii) one of the plurality of additional indications of requests for information; and/or generating a plurality of additional user device markers associated with the set of users, each of the plurality of user device markers indicating one of the set of additional vehicle dealer lots. In such embodiments, generating the map view data may include overlaying the plurality of additional user device markers on the representation of the map. Moreover, some embodiments may overlay and present only one marker from (i) the user device marker or (ii) the plurality of additional user device marker on the representation of the map for each of the set of additional vehicle dealer lots.

BRIEF DESCRIPTION OF THE DRAWINGS

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1:
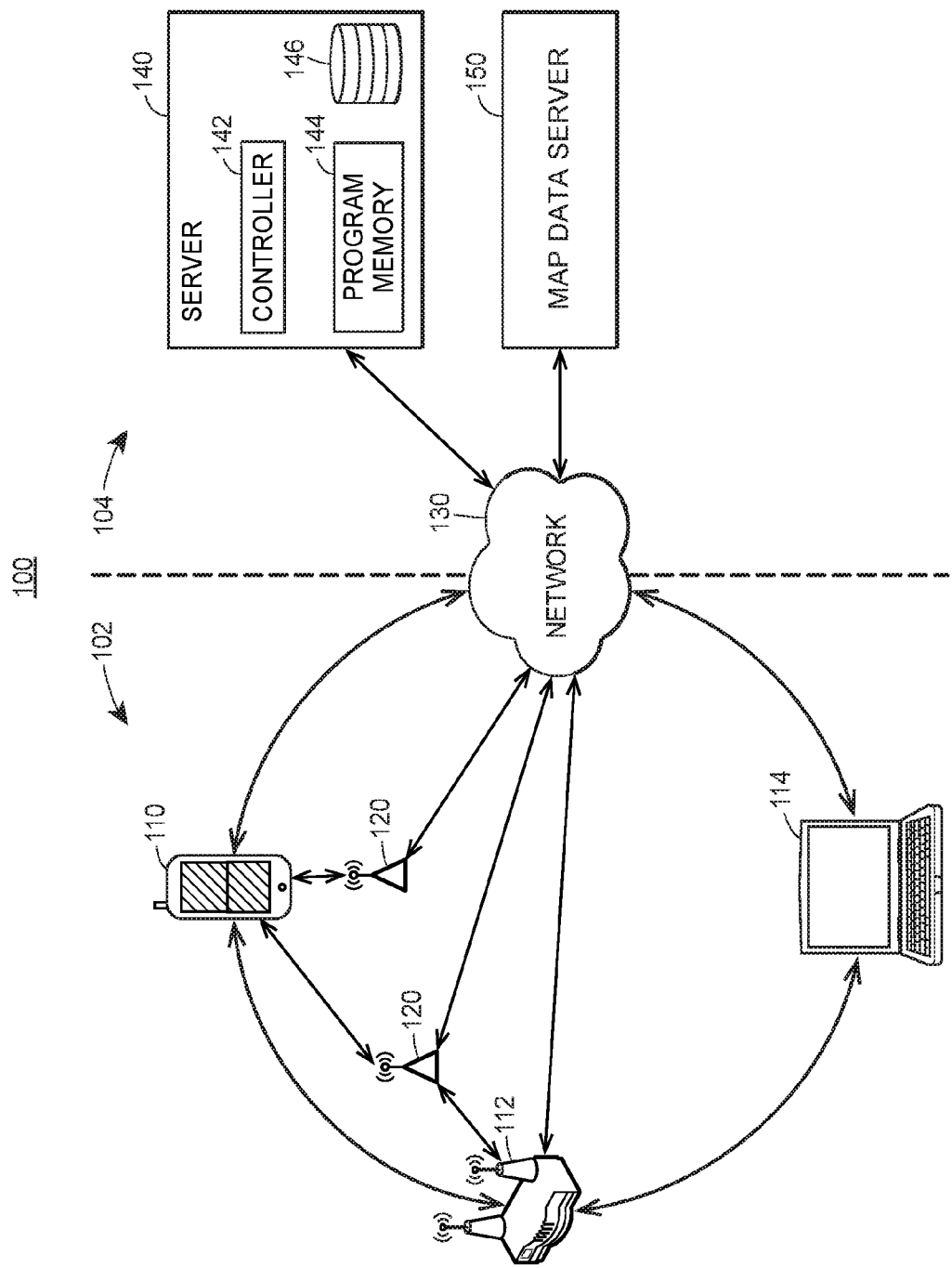
FIG. 1 illustrates a block diagram of an exemplary data system on which the methods described herein may operate in accordance with the embodiments described herein.

The invention described herein is related to methods and systems that combine geospatial location data and activity data from users of mobile computing devices to present uniquely informative reports. In accordance with the following embodiments, geospatial location data may be generated by user mobile devices in response to a user action that serves as a triggering event. Such user actions may include requesting particular types of data from a remote server or viewing a web page on the user mobile device. In response to such user action, the user mobile device may generate geospatial location data, which may then be transmitted to the remote server, along with additional data regarding the user action. The remote server may store such received user data until a request for a report is received from an operator of a computing device. Upon receiving such request, the remote server may compare the received user data with map data to generate information for the report. In some embodiments, comparing the user data with the map data may include determining whether the user is within an area of interest, such as whether the user was located on a vehicle dealer lot at the time of the user action.

The remote server may use polygon map data representing the area of interest to accurately determine whether the user was within the area of interest, rather than being merely near the area of interest. This distinction between being within the area of interest or merely near the area of interest is important for some reporting purposes, such as where an area of interest is near other competitors or areas where users may be located for reasons unrelated to the area of interest. For example, vehicle dealer lots are often located in crowded areas near other dealer lots, such that it cannot be assumed that visitors to a web site providing information regarding vehicles are located at a particular dealer lot simply based upon proximity. Therefore, accurate geospatial location data must be obtained and compared against accurate polygonal representations of the vehicle dealer lot to determine whether users are on the dealer lot or are merely near the dealer lot—perhaps even on a competitor's lot. This problem uniquely arises in generating reports using mobile device location data because such data does not inherently distinguish between users within an area (e.g., users on a dealer lot) and users simply near the area for any number of reasons (e.g., users in a coffee shop across the street from a dealer lot). The systems and methods described herein use polygon map data to define an area within a geospatial mapping system that accurately and precisely represents the area of interest. The user location data is then compared against this polygonal area to distinguish between users who are within or merely near the area of interest. Once such determination is made, additional statistics regarding user visits to the area of interest or user actions may be determined and included in the report. In some embodiments, the report may include a map view that illustrates the polygonal area within the map and overlays markers of user locations (or locations associated with use actions) on the map to distinguish between visitors and nearby users. The methods and systems are described in further detail below.

FIG. 1 illustrates a block diagram of an exemplary data system 100. The high-level architecture includes both hardware and software applications, as well as various data communications channels for communicating data between the various hardware and software components. The data system 100 may be roughly divided into front-end components 102 and back-end components 104. The front-end components 102 may communicate via a network 130 with the back-end components 104, as well as with other front-end components 102. For example, the front-end components 102 may include a plurality of computing systems communicatively connected to the back-end components 104 via the network 130. As illustrated, the computing systems may include a mobile computing device 110 associated with a user (e.g., a smartphone of a customer) and a computing device 114 associated with a vehicle dealer (e.g., a desktop computer, notebook, or tablet computer). The mobile computing device 110 may be used by a user to request and obtain data using one or more software programs, such as information regarding vehicles or vehicle dealers. The mobile computing device 110 may be configured to determine an absolute or relative geospatial location of the user by one or more location determination modules, as described further elsewhere herein. In some embodiments, the mobile computing device 110 may communicate with one or more routers 112 or beacons 120 to exchange data or determine a geospatial location of the mobile computing device 110. The computing device 114 may be used by an operator to request and review data collected from one or more mobile computing devices 110, which may be obtained by the computing device 114 from the server 140 via the network 130. Although one mobile computing device 110 and one computing device 114 are shown, it should be understood that the data system 100 may include a plurality of each (e.g., hundreds or thousands of such devices). Any of the front-end components 102 may be directly or indirectly (e.g., through a router 112) connected to the network 130. In some embodiments, the one or more mobile computing devices 110 may be communicatively connected to the computing device 114 through the router 112, without communication through the network 130.

The back-end components 104 may operate in coordination with the front-end components 102 to collect, analyze, and present information. To this end, the back-end components 104 may include a server 140 that stores information received from the front-end components 102 via the network 130. The server 140 may further generate maps or other report data based upon location and other data from the front-end components 104, particularly data received from mobile computing devices 110. In some embodiments, the back-end components 104 may include one or more map data servers 150, which may provide map data to the server 140. The map server 150 may be a third-party server operated by an entity separate from the entity operating the server 140, which may supply map data to the server 140 periodically or upon receiving a request for map data from the server 140. The server 140 may include a controller 142 to process data and run software programs, applications, or routines stored in a program memory 144, and the server 140 may further include or be communicatively connected to a database 146 for data storage and retrieval.

The front-end components 102 may be arranged in various configurations including varying components depending upon the desired scope of tracking and reporting. In preferred embodiments, the front-end components 104 may include a plurality of mobile computing devices 110 configured to access information via the network 130 and to determine geospatial locations of the devices. In an exemplary embodiment described in detail herein, the front-end components 102 and back-end components 104 may be used to facilitate a vehicle research and purchase process for users. Correspondingly, the components may be used to provide information to vehicle dealers regarding user visits, research, and indications of interest in specific vehicles or types of vehicles. Each of these mobile computing devices 110 may request data regarding vehicles or vehicle dealers through a general-purpose or special-purpose software application running on the device, such as from a web browser, a data service application, or a messaging application (e.g., via an automated or live communication session). The mobile computing devices 110 may obtain the data via the network 130 from the server 140, which server 140 may store information regarding the requests. The server 140 may further acquire and store information regarding the users' locations, as determined by the mobile computing devices 110. Such information regarding user geospatial location may be associated with users, information requests, or other activities. The location and additional information may be processed by the server 140 to generate map-based or other reports for vehicle dealers or other entities. Such reports may be generated upon receipt of requests from computing devices 114. Additional front-end components 102 (i.e., routers 112 or beacons 120) may be included to facilitate location determination or to provide information to the users' mobile computing devices 110.

In various embodiments, the mobile computing device 110 may be any known or later-developed dedicated-use or general-use mobile personal computer, cellular phone, smartphone, tablet computer, or wearable computing device (e.g., a watch, glasses, etc.), having one or more module or units for determining the location of the mobile computing device 110. In a preferred embodiment, the mobile computing device 110 may be a general use smartphone or tablet computer with a Global Positioning System (GPS) receiver. In some embodiments, the mobile computing device 110 may be a thin client device, wherein much or all of the computing processes are performed by the server 140, with information communicated between the thin client mobile computing device 110 and the server 140 via the network 130. The mobile computing device 110 may include any number of internal components and may be further communicatively connected to one or more external components by any known wired or wireless means (e.g., USB cables, Bluetooth communication, etc.). Because of the energy demands associated with use of the mobile computing device 110 and its associated components in determining geospatial location, it may be advantageous in some embodiments to limit location determination. Such limitations may include causing the device to determine location only upon the occurrence of a triggering action (such as a request for data regarding a vehicle or vehicle dealer) or causing the device to determine location no more frequently than a specified rate (e.g., 0.1 seconds, 10 seconds, 1 minute, etc.). User settings on the mobile computing device 110 may also limit the type or frequency of location determinations by the device. The mobile computing device 110 is further discussed below with respect to FIG. 2.

One or more routers 112 may be included within the data system 100 to facilitate communication or geospatial location determination. The routers 112 may be any wired, wireless, or combination wired/wireless routers using any known or here-after developed communication protocol for general- or special-purpose computer communication. In some embodiments, the geospatial locations of one or more routers 112 may be determined and utilized to determine the geospatial location of the mobile computing devices 110 based upon signal strength, such as by triangulation. In some embodiments, the mobile computing devices 110 or computing devices 114 may be communicatively connected to the network 130 via one or more routers 112.

Additionally, or alternatively, the data system 100 may include one or more beacons 120 configured to communicate wirelessly with mobile computing devices 110. Such beacons 120 may be placed at known locations, or locations of the beacons 120 may be determined following placement. Once operational, the beacons may communicate with the mobile computing devices 110 to provide location or other information. For example, a vehicle dealer lot may contain a plurality of beacons 120 associated with a plurality of sections of the lot, which beacons 120 may transmit their identities using low-power transmission modes. Upon receiving such low-power transmissions, a mobile computing device 110 may record the identity of one or more beacons 120 or may determine a location based thereupon. As a further example, the mobile computing device 110 may determine its location based upon signal strength or another indication of proximity to one or more beacons 120. If the beacons 120 transmit geospatial location data, the mobile computing device 110 may further communicate such data to the server 140 or may determine a geospatial location of the mobile computing device 110 from the received beacon location data. Wireless communication may occur by any known means, such as Bluetooth, Wi-Fi, or other appropriate radio-frequency or other communications protocols.

The front-end components 102 communicate with the back-end components 104 via the network 130. The network 130 may be a proprietary network, a secure public internet, a virtual private network or some other type of network, such as dedicated access lines, plain ordinary telephone lines, satellite links, cellular data networks, combinations of these, etc. Where the network 130 comprises the Internet, data communications may take place over the network 130 via an Internet communication protocol.

The back-end components 104 include one or more servers 140 and may further include one or more map data servers 150. Each server 140 may include one or more computer processors within the controller 142 adapted and configured to execute various software applications and routines of the data system 100 stored in the program memory 144, in addition to other software applications. The controller 142 may include one or more processors (not shown), a random-access memory (RAM) (not shown), the program memory 144, and an input/output (I/O) circuit (not shown), all of which may be interconnected via an address/data bus (not shown). The RAM and program memory 144 may be implemented as semiconductor memories, magnetically readable memories, optically readable memories, or any other type of memory known or hereafter developed. The server 140 may further include one or more databases 146, which may be adapted to store geospatial location and other data received from the front-end components 102, as well as vehicle or vehicle dealer information communicated to the front-end components 104. Such data might include, for example, information regarding vehicles listed for sale by vehicle dealers, information regarding averages for vehicles of specified types, makes, models, or years, information regarding vehicle dealer inventory, hours, or customer ratings, or other related information. The server 140 may access data stored in the database 146 when executing various functions and tasks associated with the data system 100.

Figure 2:
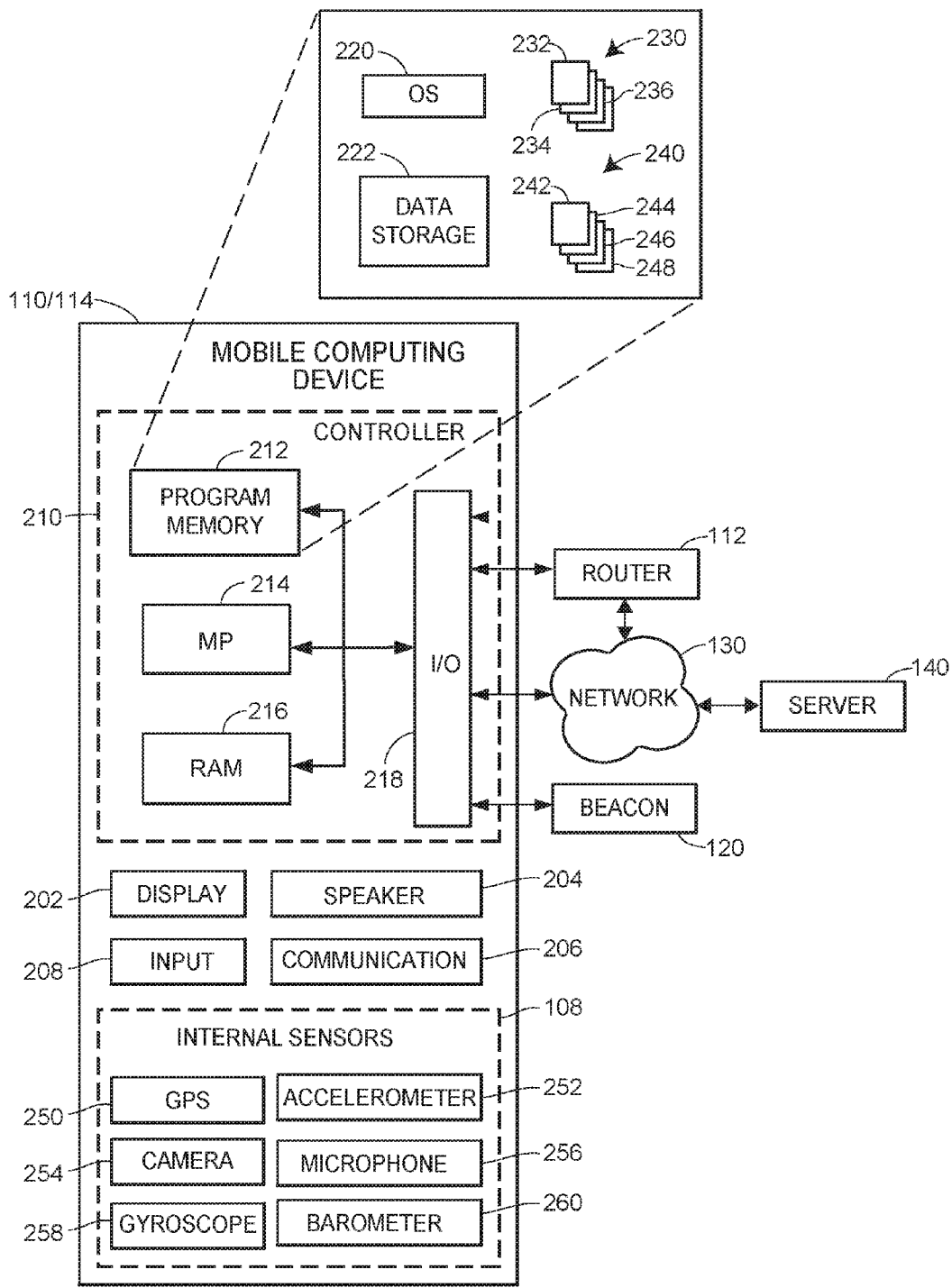
FIG. 2 illustrates a block diagram of an exemplary mobile computing device in accordance with the embodiments described herein.

FIG. 2 illustrates a block diagram of an exemplary mobile computing device 110 or computing device 114 in accordance with the data system 100. Because the computing device 114 may be a mobile device or a desktop computer having additional or fewer components than the mobile computing device 110, the following description refers to the mobile computing device 110. It should be understood, however, that any combination of features described herein with respect to the mobile computing device 110 may be included in the computing device 114.

The mobile computing device 110 may be a smartphone, a tablet computer, or similar mobile device capable of receiving and processing electronic information. The mobile computing device 110 may include one or more internal sensors 108, which may provide sensor data regarding the local physical environment or the device's location therein. Additionally, the mobile computing device may receive additional data from one or more external beacons 120 or from one or more routers 112. The data may be processed by the controller 210 to perform various operations for the user. Additionally, or alternatively, the data may be sent to one or more processors of the server 140 through the network 130 for processing. When the controller 210 (or other processor) receives an indication of a user action or request, appropriate responses are determined and implemented. Such responses may include processing data for presentation to the user, requesting data from the server 140, processing data from other front-end components 102 or back end components 104, determining a geospatial location of the mobile computing device 110, sending data to the server 140, or presenting information to the user via a display 202 or speaker 204. In some embodiments, the mobile computing device 110 may include a communication unit 206 to send or receive information from local or remote devices (e.g., computing device 114 or server 140), either directly or through the network 130. The communication unit 206 may include a wireless communication transceiver, such as a Wi-Fi or Bluetooth communication component. Further embodiments of the mobile computing device 110 may include one or more inputs 208 to receive instructions, selections, or other information from a user of the mobile computing device 110.

The mobile computing device 110 may include various input and output components, units, or devices. The display 202 and speaker 204, along with other integrated or communicatively connected output devices (not shown), may be used to present information to the user of the mobile computing device 110 or others. The display 202 may include any known or hereafter developed visual or tactile display technology, including LCD, OLED, AMOLED, projection displays, refreshable braille displays, haptic displays, or other types of displays. The one or more speakers 204 may similarly include any controllable audible output device or component, which may include a haptic component or device. In some embodiments, communicatively connected speakers 204 may be used (e.g., headphones, Bluetooth headsets, docking stations with additional speakers, etc.). The input 208 may further receive information from the user. Such input 208 may include a physical or virtual keyboard, a microphone, virtual or physical buttons or dials, or other means of receiving information. In some embodiments, the display 202 may include a touch screen or otherwise be configured to receive input from a user, in which case the display 202 and the input 208 may be combined.

The mobile computing device 110 may further include various internal sensors 108. In some embodiments, additional data may be received from external beacons 120 communicatively connected to the mobile computing device 110, either directly or through the network 130. The internal sensors 108 may include any devices or components mentioned herein, other extant or later-developed devices suitable for monitoring a physical environment (including device position or location within the environment). The sensors of the mobile computing device 110 may further include additional internal sensors 108 specifically configured for determining location, such as geolocation, movement tracking, or spatial orientation of the device.

Although discussion of all possible sensors of the mobile computing device 110 would be impractical, if not impossible, several sensors warrant particular discussion. Disposed within the mobile computing device 110, the internal sensors 108 may include a GPS unit 250, an accelerometer 252, a camera 254, a microphone 256, a gyroscope 258, or a barometer 260. Any or all of these may be used to generate sensor data related to the device's geospatial location, user activity, or other relevant information. Additionally, other types of currently available or later-developed sensors may be included in some embodiments.

The GPS unit 250, the accelerometer 252, and the gyroscope 258 may provide information regarding the location or movement of the mobile computing device 110. The GPS unit 250 may use "Assisted GPS" (A-GPS), satellite GPS, or any other suitable global positioning protocol (e.g., the GLONASS system operated by the Russian government) or system that locates the position of the mobile computing device 110. For example, A-GPS utilizes terrestrial cell phone towers or Wi-Fi hotspots (e.g., wireless router points) to more accurately and more quickly determine location of the mobile computing device 110, while satellite GPS generally is more useful in more remote regions that lack cell towers or Wi-Fi hotspots.

The accelerometer 252 may include one or more accelerometers positioned to determine the force and direction of movements of the mobile computing device 110. In some embodiments, the accelerometer 252 may include a separate X-axis accelerometer, Y-axis accelerometer, and Z-axis accelerometer to measure the force and direction of movement in each dimension respectively. It will be appreciated by those of ordinary skill in the art that a three dimensional vector describing a movement of the mobile computing device 110 through three dimensional space can be established by combining the outputs of the X-axis, Y-axis, and Z-axis accelerometers using known methods. Similarly, the gyroscope 258 may be used in addition to, or instead of, the accelerometer 252 to determine movement of the mobile computing device 110. For example, a MEMS gyroscope may be included within the mobile computing device 110 to detect movement of the mobile computing device 110 in three dimensional space. Of course, it should be understood that other types of gyroscopes 258 or other types of movement-detecting sensors may be used in various embodiments. In some embodiments, one or more accelerometers 252 or gyroscopes 258 may be disposed within a wearable device associated with a user, such that the sensor data therefrom may indicate movement of the user. Such sensor data may further be used to determine relative movements of the user to better track location over time. For example, movement data may be used to determine the length of time a user spends at a particular location, such as examining a vehicle on a vehicle dealer lot.

The camera 254 may be used to capture images of vehicles or other relevant objects in the user's environment. It should be understood that one or more cameras 254 may be disposed within the mobile computing device 110 and configured to generate either still images or video recordings. It should further be understood that many smartphones or tablet computers include front and back solid state digital cameras, which may be used to simultaneously obtain images of a large portion of the area before and behind the phone or tablet. In some embodiments, the camera 254 may include a flash or lighting device to illuminate the subject area. The microphone 256 may be used to monitor sounds within the local physical environment 106. One or more microphones 256 may be disposed within the mobile computing device 110 or may be communicatively connected thereto. The one or more microphones 256 may be used to record sounds or to receive voice commands from a user. The barometer 260 may likewise be used to detect changes in atmospheric pressure within the local physical environment of the mobile computing device 110. Such barometers 260 may include MEMS barometers disposed within a smartphone or tablet.

The mobile computing device 110 may also communicate with the router 112, the beacons 120, or the network 130 using the communication unit 206, which may manage communication between the controller 210 and external devices. The communication unit 206 may transmit and receive wired or wireless communications with external devices, using any suitable wireless communication protocol network, such as a wireless telephony network (e.g., GSM, CDMA, LTE, etc.), a Wi-Fi network (802.11 standards), a WiMAX network, a Bluetooth network, etc. Additionally, or alternatively, the communication unit 206 may also be capable of communicating using a near field communication standard (e.g., ISO/IEC 18092, standards provided by the NFC Forum, etc.). Furthermore, the communication unit 206 may provide input signals to the controller 210 via the I/O circuit 218. The communication unit 206 may also transmit sensor data, device status information, control signals, or other output from the controller 210 to one or more of the router 112, the beacons 120, the network 130, or the server 140.

The mobile computing device 110 may further include a controller 210. The controller 210 may receive, process, produce, transmit, and store data. The controller 210 may include a program memory 212, one or more microcontrollers or microprocessors (MP) 214, a random access memory (RAM) 216, and an I/O circuit 218. The components of the controller 210 may be interconnected via an address/data bus or other means. It should be appreciated that although FIG. 2 depicts only one microprocessor 214, the controller 210 may include multiple microprocessors 214 in some embodiments. Similarly, the memory of the controller 210 may include multiple RAM 216 and multiple program memories 212. Although the FIG. 2 depicts the I/O circuit 218 as a single block, the I/O circuit 218 may include a number of different I/O circuits, which may be configured for specific I/O operations. The microprocessor 214 may include one or more processors of any known or hereafter developed type, including general-purpose processors or special-purpose processors. Similarly, the controller 210 may implement the RAM 216 and program memories 212 as semiconductor memories, magnetically readable memories, optically readable memories, or any other type of memory.

The program memory 212 may include an operating system 220, a data storage 222, a plurality of software applications 230, and a plurality of software routines 240. The operating system 220, for example, may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 222 may include data such as user profiles and preferences, application data for the plurality of applications 230, routine data for the plurality of routines 240, and other data necessary to interact with the server 140 through the digital network 130. In some embodiments, the controller 210 may also include, or otherwise be communicatively connected to, other data storage mechanisms (e.g., one or more hard disk drives, optical storage drives, solid state storage devices, etc.) that reside within the mobile computing device 110. Moreover, in thin-client implementations, additional processing and data storage may be provided by the server 140 via the network 130.

The software applications 230 and routines 240 may include computer-readable instructions that cause the processor 214 to implement location, processing, and communication functions. Thus, the software applications 230 may include a vehicle information application 232 to obtain and present information regarding vehicles and vehicle dealers, a web browser application 234 to obtain and present web-based content, and a mapping application 236 to present visual maps based upon user parameters. The software routines 240 may support the software applications 230 and may include routines such as a location routine 242 to determine a location of the mobile computing device 110 from GPS or other data, a communication routine 244 for communicating with the server 140 via the network 130, a data request routine 246 to allow a user to specify parameters for requesting data, and a data presentation routine 248 for generating or presenting received data to the user via the display 202. It should be understood that additional or alternative applications 230 or routines 240 may be included in the program memory 212, including other applications of the sort ordinarily stored on a mobile devices.

In some embodiments, the mobile computing device 110 may include a wearable computing device or may be communicatively connected to a wearable computing device. In such embodiments, part or all of the functions and capabilities of the mobile computing device 110 may be performed by or disposed within the wearable computing device. Additionally, or alternatively, the wearable computing device may supplement or complement the mobile computing device 110. For example, the wearable computing device 110 may be a smart watch with a display 202, a speaker 204 (or haptic alert unit), an input 208, and one or more internal sensors 108, such as a GPS unit 250. Such smart watch may be communicatively connected to a smartphone and used interchangeably with the smartphone for some purposes (e.g., displaying information, providing user alerts, etc.).

The data system 100 described above and illustrated in FIGS. 1-2 may be used to perform the location determination and mapping methods discussed further below. Together, the methods described below relate to generating electronic maps of locations associated with user interaction with a mobile device. Specifically, the methods involve determining user interaction with a mobile computing device 110 to obtain information related to a vehicles or vehicle dealers. Such user interactions may be recorded by the server 140 for multiple users over a period of time. Maps of such user interactions and associated locations may then be generated by the server 140 and presented to an operator of the computing device 114 as part of a report. Although the methods are described with reference to vehicles and vehicle dealers, the methods may be applied to other situations in which users may interact with mobile devices to obtain information at various locations associated with the objects to which the information relates.

Figure 3:
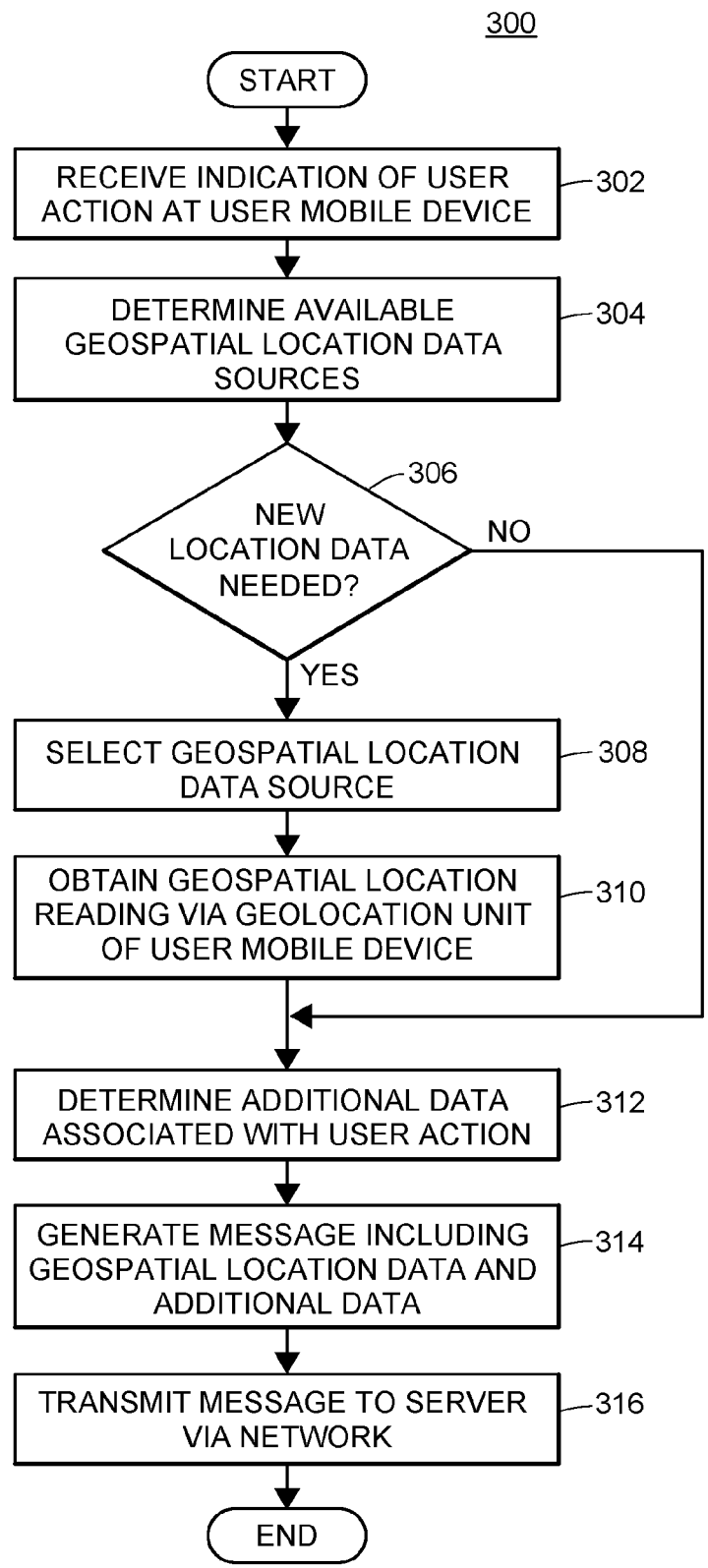
FIG. 3 illustrates a flow diagram of an exemplary location determination method in accordance with the embodiments described herein.

FIG. 3 illustrates a flow diagram of an exemplary location determination method 300 for determining the location of a user mobile device, such as a mobile computing device 110. Once the location is determined by the user mobile device, location data may be communicated to a remote server, such as a server 140, via a network, such as the network 130. In addition to location data, additional data associated with user interaction with the user mobile device may be likewise determined and communicated to the remote server. The remote server may store and process the location and additional data to generate map views, as discussed further below. The method 300 may be implemented by a software application, such as the vehicle information application 232 or the location routine 242, controlling the user mobile device, based upon settings of the application or general settings of the mobile device.

The method 300 may begin upon receipt of an indication of a user action at the user mobile device (block 302). In response to receiving the indication, the user mobile device may determine the available geospatial location data sources that may be used by the software application to determine the device location of the user mobile device (block 304). The user mobile device may then determine whether new location data is needed (block 306), and may take appropriate actions. When a new location is needed, the user mobile device may select a geospatial location data source (block 308) and obtain a geospatial location reading via a geolocation unit (such as the GPS unit 250) of the user mobile device (block 310). Once sufficient location data has been obtained, the user mobile device may further determine additional data associated with the user or the user's actions (block 312). Such additional data may include information regarding data requested by the user regarding vehicles or vehicle dealers. The user mobile device may then generate a message to the remote server including the location data and any additional data (block 314) and transmit the message to the remote server via a network (block 316). In some embodiments, the exemplary method 300 may be modified to include alternative, additional, or fewer actions.

At block 302, the user mobile device may receive an indication of a user action that serves as a triggering event for determining location. The triggering event may be either internal or external to the user mobile device, as well as being either a manual request from the user or an automatically generated indication of an action. As an example, the user action may include interacting with the user mobile device to start a software application that provides information regarding vehicles or vehicle dealers. Alternatively, the user action may include requesting information regarding a vehicle, type of vehicle, or vehicle dealer (e.g., by searching for an item or selecting an item displayed while browsing similar items). As a particular example, the user mobile device may receive the indication of a user action from the remote server via the network when the user interacts with a web browser application on the user mobile device to request vehicle or vehicle dealer information from the remote server. Upon the occurrence of a user action, the user mobile device may generate an indication associated with the user action to trigger location determination. For example, a routine or process running within a software application or running in the background on the user mobile device may automatically generate the indication upon the occurrence of a user interacting with an application to request, retrieve, or view data related to a specific vehicle, a type of vehicle, or a vehicle dealer. Such routine or process may monitor the user's interaction with the user mobile device or other actions that may serve as triggering events. Such non-interaction user actions may include transporting the user mobile device to a location of particular interest, such as by the user visiting an area at or near a vehicle dealer lot (i.e., being located on or within a radius of specified distance from a point representing a location). The routine or process may monitor the user's location passively based upon geospatial location data generated by the mobile computing device for other purposes, or the routine or process may monitor the user's location actively by controlling the user mobile device to obtain geospatial location data. Once the indication of user action is generated, a software application or routine of the user mobile device may then receive the generated indication of the user action, which may further cause the application or routine to determine the geospatial location of the user mobile device.

At block 304, the user mobile device may determine one or more sources of geospatial location data available for determining the device's location. This determination may include a determination of the capabilities of the user mobile device, the receipt and strength of broadcast signals needed for location determination, power requirements of the data source or limitations of the device, processing requirements of the data source or time limitations for the determination, general device settings concerning location services, or settings specific to an application or routine concerning location services. For example, the user mobile device may have settings limiting the use of GPS location by applications running on the device because of the large amount of power used by the GPS unit 250. General or specific device settings may also allow or restrict communication with cellular data towers, such as through activation or deactivation of an airplane mode of the device. As another example, the user mobile device may be configured to determine location by comparison of signal strength from known locations of wireless routers 112 or by proximity to beacons 120, which may only be available to determine location if the user mobile device is in proximity to such routers or beacons. Other factors that may impact signal strength may also influence whether a geospatial location data source is considered to be available, such as electromagnetic interference or shielding, loss of line of sight to GPS satellites, severe weather, power outages, etc. In any event, the user mobile device may determine a source is unavailable if device settings prohibit use at the time or if the received strength of a necessary signal used in the determination is insufficient to determine the location of the user mobile device with a predetermined accuracy. In some embodiments, the user mobile device may determine availability of the data source based upon the accuracy of the location determination by the device under prevailing environmental conditions. In further embodiments, the availability of geospatial location data sources may include the availability of recent location data for the user mobile device, such as recently determined locations of the device (e.g., within the preceding minute, half-minute, second, 0.1 seconds, etc.). Such recent location data may include location data identified by the user mobile device for any purpose, include locations determined for use by other applications running on the device.

At block 306, the user mobile device may determine whether new location data for the device is needed. As noted above, the user mobile device may have recently determined its geospatial location. Such recent location data may have been generated by the device upon the receipt of a previous indication of a user action. For example, the user may browse through a plurality of pages displaying vehicle information for a plurality of vehicles in quick succession. Because it is unlikely that the user mobile device would have traveled a significant distance between these successive actions, new location data may not be needed. Alternatively, the user mobile device may have determined its location shortly before the user action for an unrelated purpose. For example, a user may have viewed a map on the user mobile device immediately prior to requesting information regarding a vehicle dealer, which may have caused the device to determine its location. An application or routine running on the user mobile device may determine whether new location data is needed based upon the existence and sufficiency of one or more recently determined locations. Location data may be determined to be sufficiently recent if it was determined within a predetermined period of time prior to the user action (e.g., ten second, one second, etc.), which period may depend upon device settings, a type of the user action, or other factors. Location data may be determined to be sufficiently accurate if it meets a predetermined accuracy threshold (e.g., ten meters, five meters, etc.) or if it is as accurate as the accuracy expected from a new location determination using the available data sources. In some embodiments, the sufficiency of the recent location data may depend upon a combination of time and accuracy. If sufficiently accurate and sufficiently recent location data exists for the user mobile device, the user mobile device may determine that new location data is not needed, thus the method 300 may continue with the determination of additional data at block 312. If no sufficiently accurate and sufficiently recent location data exists for the user mobile device, the user mobile device may determine that new location data is needed, thus the method 300 may continue with the selection of a data source at block 308.

At block 308, the user mobile device may select one or more of the available geospatial data sources to use in determining the location of the device. The selection may be made based upon a comparison of location accuracy or precision levels of the sources and location accuracy or precision requirements associated with the eventual use of the geospatial location data. Location accuracy and precision may be determined by known techniques based upon a probability of the determined location of the device being within a distance of the actual location of the device, which may be expressed as a radius (e.g., 5 meters, 10 meters, etc.) associated with a confidence level (e.g., 95% confidence, 90% confidence). The selection may additionally or alternatively be made based upon power usage levels associated with location determination using the available sources. In some embodiments, the selection may include a plurality of data sources that may be combined to determine the geospatial location of the device with greater accuracy or precision than the individual sources alone. In further embodiments, a plurality of geospatial data sources may be sequentially selected to attempt to obtain geospatial location data with sufficient accuracy. Accuracy may be determined as a property of the data source in some instances. In a preferred embodiment, the user mobile device attempts to select a data source with an accuracy of thirty meters or better (i.e., where the radius associated with applicable confident level is no larger than thirty meters). In a more preferred embodiment, the user mobile device attempts to select a data source with an accuracy of ten meters or better. Once the one or more geospatial data sources are selected, the user mobile device may use the selected sources to determine the device's location.

At block 310, the user mobile device may determine the device's location by obtaining one or more geospatial location readings using the one or more geospatial data sources. In some embodiments, the user mobile device may obtain the geospatial location readings via a geolocation unit within the device, such as the GPS unit 250 of the mobile computing device 110. The geolocation unit or processor of the user mobile device may further process the obtained geospatial location readings (i.e., signals transmitted by a geospatial data source or information derived therefrom) to determine the geospatial location of the device. Such processing may include performing one or more sets of calculations, algorithmically evaluating the geospatial location readings, or selecting one or more values from lookup tables to generate geospatial location data indicating the location of the user mobile device based upon the obtained geospatial location readings. As an example, an antenna of the GPS unit 250 may obtain geospatial location readings from a plurality of GPS transmitter satellites, which may then be processed by the GPS unit 250 to calculate the device location based upon differences in the received signals. In some embodiments, obtaining the geospatial location data may include obtaining user permission to generate or transmit geolocation data, such as when a web site using HTML 5 requests geolocation data. In further embodiments, determining the location of the user mobile device may include generating geospatial location data in a prescribed format utilizing a predetermined geographic coordinate system, which may be a different format or system than the native output of the geolocation unit. The geospatial location data may further include or be associated with a timestamp or indicator of the user mobile device or user thereof.

At block 312, in some embodiments, the mobile user device may further determine additional data associated with the user action or the state of the user mobile device. Such additional data may include a user identifier (e.g., user account ID, device ID, etc.), an indication of a user interaction with the user mobile device (e.g., user-initiated search parameters, page views, user selection of an option to save or send data, application use, etc.), or an indication of a user action other than an interaction with the user mobile device (e.g., user location, change in user location, previous user interaction with another computing device, etc.). The additional data may be directly or indirectly indicative of a user intention or interest in taking the user action that caused the user mobile device to determine its location. For example, a user shopping for a car may access a vehicle detail page (VDP) or dealer profile page (DPP) within a web browser or software application running on the user mobile device in order to obtain information regarding the vehicle or dealer. This additional information may be useful in determining the user's interest in certain types of vehicles. If the user is logged in to an account, information about previous VDP or DPP views may be retrieved, or the user may select an option to save information regarding a vehicle for future review. In further embodiments of the same example, information regarding a user selection of an option to contact a dealer (e.g., via telephone, e-mail, or chat) may be of particular value as indicating a strong user interest in a specific vehicle. Additional information may similarly include details regarding the user's interaction with the user mobile device or other actions, such as time spent viewing a page, number of related pages viewed, time spent at a location, photographs taken at a location, searches performed at a location, or pages viewed at a location. Such data may be useful in combination with the user mobile device location data to understand the user's intent or purpose. For example, the user may coincidentally happen to be near a vehicle dealer lot while searching for vehicles, or the user may have previously searched vehicles at the lot and spent time on the lot comparing vehicles using the user mobile device.

At block 314, the user mobile device may generate a message including the geospatial location data and additional data determined as described above. The message may be formatted for efficient transmission by removing redundant or extraneous information. In some embodiments, the message may sanitize the data to remove information that identifies the user. In such embodiments, the message may include only non-identifying data that may be used for generating reports presenting statistical data regarding a plurality of users. In some such embodiments, the message may include additional data regarding previous user activity, which may be retrieved by the user mobile device from a remote server and included in the message without identifying information. In such manner, the message may include information associated with a user account over a period of time, while not including information identifying the user. Once generated, the message may be stored in a memory of the user mobile device or may be transmitted to a remote server. If stored at the user mobile device, further supplemental data may be later added to the message prior to transmission to the remote server, which supplemental data may be determined in the same manner as described herein regarding method 300. In some embodiments, multiple messages may be generated to include data regarding multiple locations or multiple user actions.

At block 316, the user mobile device may transmit the one or more generated messages to the remote server via the network. The user mobile device may communicate with the remote server to send the one or more messages via a communication unit 206 using any convenient protocol. As noted above, the user mobile device may hold the messages for communication to the sever at a time removed from the time of the location determination. The messages may be held until the user mobile device is connected to a high-bandwidth or unmetered communication connection, such as a WiFi connection, to avoid network congestion or avoid data charges. The user mobile device may similarly delay communicating the messages to the remote server until the user is determined to have completed a session of interaction with the device or has left a location. For example, the messages may be transmitted when the user closes a software application, navigates away from a web site, or remains inactive for a period of time (e.g., ten minutes, thirty minutes, etc.). Once the one or more messages have been transmitted to the remote server, the data method 300 may end. The remote server may then store and process the received data as described herein, either immediately or at a later time. The data method 300 may be implemented again upon the occurrence of another user action that serves as a triggering event.

Figure 4:
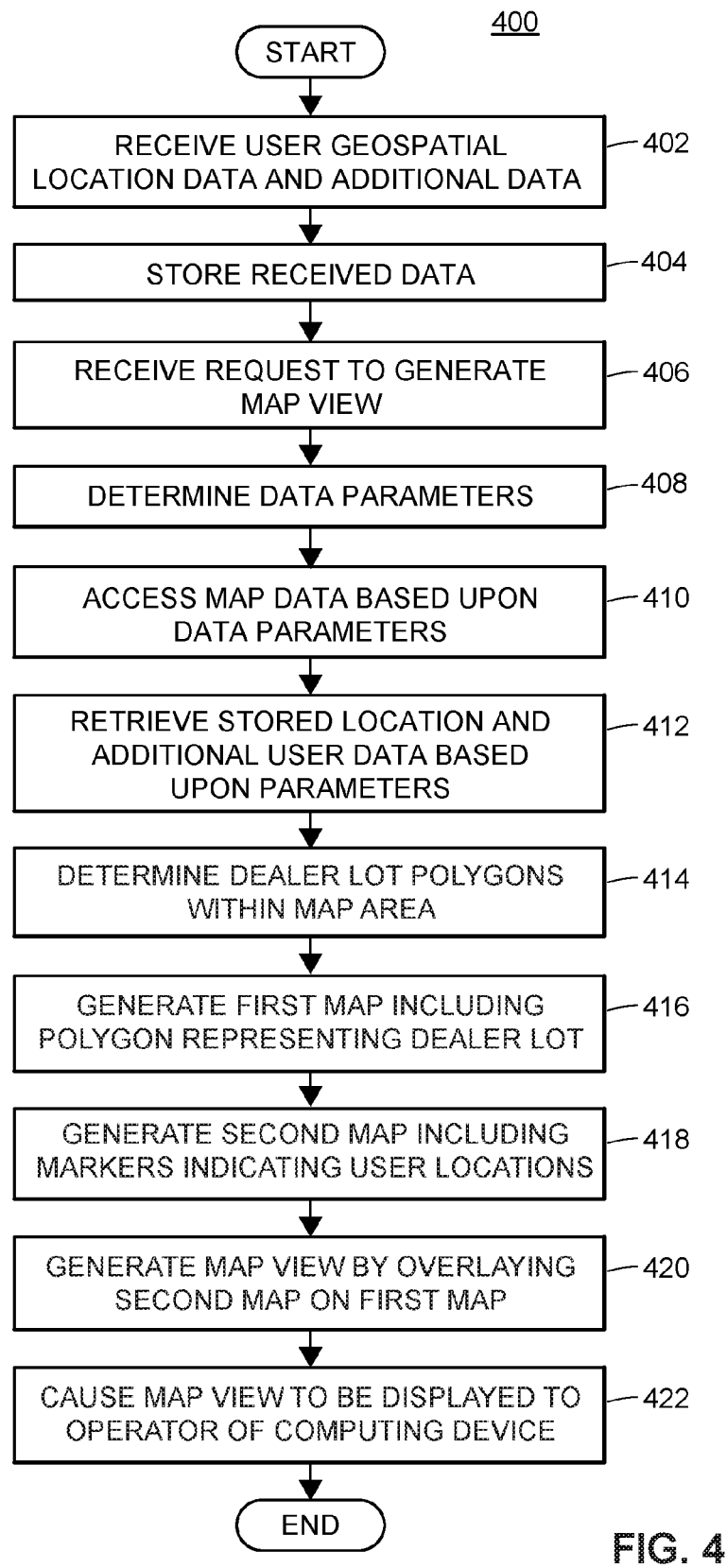
FIG. 4 illustrates a flow diagram of an exemplary map generation method in accordance with the embodiments described herein.

FIG. 4 illustrates a flow diagram of an exemplary map generation method 400 for generating a map view based upon geospatial location data received from one or more user mobile devices. The method 400 may be implemented by one or more remote servers, such as the server 140, to receive messages from a plurality of user mobile devices implementing the data method 300 described above and to store the received data in a memory, such as the database 146. The user mobile devices may be mobile computing devices 110, which may communicate with the remote server via the network 130. The map view may present information regarding the locations of user activity for one or more users. For example, the locations of users visiting a web site for vehicle or dealer information may be plotted against a detailed polygonal representation of a vehicle dealer lot to show mobile device activity on or near the lot. The user location data may be further compared against the vehicle dealer lot polygon to determine whether the users were located on the lot at the recorded times. In some embodiments, this may be presented to a reviewer (e.g., a dealer representative), along with additional information regarding the users' actions. For example, the reviewer may receive a map view and a summary of other dealers that were searched by the users interacting with the user mobile devices. The reviewer may be an operator of a computing device, such as the computing device 114, which may receive the map view from the remote server via the network.

The map generation method 400 may begin by receiving geospatial location data and additional data at the remote server from one or more user mobile devices (block 402). The remote server may store the received data in a database or other memory (block 404). Upon receiving a request to generate a map view (block 406), the remote server may determine the parameters of the map view (block 408), access map data based upon the parameters (block 410), and retrieve the stored data (block 412). The remote server may also determine a vehicle dealer lot polygon within a map area based on the parameters (block 414) and generate a first map that includes a polygon representation of the vehicle dealer lot (block 416). The remote server may further generate a second map area that includes markers indicating the user geospatial locations associated with the received geospatial location data (block 418). The map view may then be generated by overlaying the first and second maps (block 420), particularly by overlaying the second map on the first map. The map view may then be communicated to a computing device for review by a reviewer (i.e., an operator of the computing device) (block 422).

At block 402, the remote server may receive geospatial location data from one or more user mobile devices via the network. In some embodiments, the remote server may also receive additional data regarding the user, the user's actions, or the user mobile device, as discussed above. The user geospatial location data and any additional data may be received by the remote server as messages transmitted from the user mobile device. In some embodiments, the data may be received in response to a request by the remote server for such data, which request may cause the user mobile device to generate and transmit one or more messages containing the data. For example, the remote server may request data from the user mobile device when a user requests information from the remote server, such as by using a web browser or software application of the user mobile device to access data stored on the remote server (e.g., viewing a web page or querying a database via the remote server). The remote server may request specific data or may specify data parameters, such as by specifying a minimum location accuracy or a maximum age of the location data. In further embodiments, the remote server may obtain part or all of the additional data from a source other than the user mobile device, or the remote server may determine part or all of the additional data from a request by the user mobile device. For example, the remote server may determine user interactions with the user mobile device based upon data the user mobile device accesses or requests from the remote server.

At block 404, the remote server may store the received geospatial location data and any additional data received in a memory associated with the remote server. The received data may be stored in a database accessible by the remote server, such as the database 146 for later retrieval. In some embodiments, the server 140 may process the received data prior to saving the data in the database, such as by combining data received in multiple messages into one user session or by generating summary statistics regarding the data (e.g., session duration, total page views, total unique dealers viewed, closest dealer lot, whether the user location was on a dealer lot, etc.). Where the user is identified by an account, user interactions with the remote server may be associated with the account and stored in the database by the remote server.

At block 406, the remote server may receive a request to generate a map view. The request may be received from a computing device via the network, and the request may include indications of parameters regarding the map view. For example, the request may indicate one or more locations or dealer lots for the map view, as well as a relevant area around the locations or lots (e.g., a radius around a point associated with a dealer lot). The indications of the parameters may further specify a time period of interest, user actions of interest, whether to include user locations near but not on a dealer lot, or other details that may be used to filter or query the received data. In some embodiments, the indications of the parameters may include predetermined sets of parameters, which may be general or customized (e.g., monthly or annual reports for vehicle dealers). In further embodiments, the request may further specify display options, such as a style or color scheme or dashboard data to present to the reviewer.

At block 408, the remote server may determine one or more data parameters from the received request. The data parameters may be used by the remote server to filter, query, or otherwise select location and additional data for the map view or any other report features to be presented to the reviewer. The remote server may extract parameters from the request by parsing the request and, in some instances, interpreting the received indications of the parameters included in the request. In some embodiments, the remote server may determine default parameters if the request does not include an indication of one or more required parameters. For example, the remote server may determine a location or vehicle dealer lot parameter based upon information associated with a user account associated with the request. As another example, a default timeframe for the map data may be set at one month. In further embodiments, the remote server may obtain missing parameters by causing one or more requests for parameter selection or input to be presented to the reviewer by the computing device.

At block 410, the remote server may access map data based at least in part upon the parameters. The map data may be associated with a map area including relevant locations, as determined from the parameters. The map area may define the boundaries of the map view. In some embodiments, the map area may include an area adjacent to the map view in order to facilitate adjustments to the map view by the reviewer. The remote server may access the map data by querying a map database associated with the remote server or by requesting the map data from another server, which may include a server associated with a third-party map data provider. In some embodiments, the remote server may obtain map data from multiple map data sources, such as a general map data source (e.g., a source providing road data, major landmarks, etc.) and a special-purpose map data source (e.g., a source providing data for a specific location, such as a vehicle dealer lot). In some embodiments, the special-purpose map data may include indications of locations associated with a plurality of vehicle dealer lots, such as competitors' lots. In some embodiments, the special-purpose map data source may be a data source that provides polygon map data defining individual buildings, properties, stores, or business locations. In a preferred embodiment, the special-purpose map data source is a data source that provides polygon map data defining one or more vehicle dealer lot. Such polygon map data may include a set of coordinates that define a polygon representing the physical boundaries (i.e., the map area footprint) of each vehicle dealer lot. In further embodiments, the polygon map data may further include sub-polygons associated with areas within the vehicle dealer lot (e.g., a showroom, an office, a section of a lot associated with a type of vehicle, etc.). The general map data source and the special-purpose map data source may be the same source or may be a plurality of separate sources.

At block 412, the remote server may retrieve stored location data based upon the determined parameters for the map view. The stored location data may be identified and retrieved based upon additional data associated with the location data entries, such as date, time, day of week, duration of visit, page views, user searches, or other types of additional data. For example, the remote server may query a database for location data corresponding to locations of user mobile devices used during the past month to view vehicle or vehicle dealer information associated with vehicles or dealers operating in an area or associated with a particular type of vehicle (e.g., light trucks, coupes, particular manufacturers or makes of vehicles, etc.). In some embodiments, additional data associated with the location data may be retrieved by the remote server. For example, additional data indicating a type of user action or a timestamp associated with the location data may be retrieved. Such additional data may be retrieved for use in generating summary statistics, to enable the map view to be filtered by the reviewer without requesting a new map view (i.e., by applying data filters at the computing device without needed additional data from the remote server), or to enable the reviewer to drill down into the map view to obtain information regarding specific markers associated with particular location data entries.

At block 414, the remote server may determine one or more polygons within the map area specified by the parameters. In preferred embodiments, the polygons may be associated with and indicative of locations of vehicle dealer lots. As noted above, the polygon map data may define one or more polygons representing vehicle dealer lots (or parts thereof) in detail. Such polygon map data and corresponding polygon representations of dealer lot areas facilitates particularly advantageous map views, reports, or statistical analyses of the location data. Without such polygon map data, location data obtained from the user mobile devices only indicates proximity to a vehicle dealer lot or other area of interest. Map views and reports using proximity data only indicate whether a user has been located near a point associated with a vehicle dealer lot (i.e., within a radius of a point somewhere on the vehicle dealer lot). Such proximity data does not distinguish between location data corresponding to users who are on the dealer lot and location data corresponding to users who are off the dealer lot. Vehicle dealer lots and other areas of interest are rarely circular, typically being rectangular or irregular shapes. Thus, the polygon map data (or an equivalent thereof) must be used to define the contours or boundaries of the area of interest (e.g., the vehicle dealer lot) within the map area. This polygon map data may be used to determine a representation of a vehicle dealer lot or other area of interest within the map area.

At blocks 416, 418, and 420, the remote server may generate first and second maps, then generate the map view by overlaying one of the first or second maps on the other of the first or second maps. Although this describes one method of generating the map view, it should be understood that other variations on the method may be implemented to generate the map view. Such variations may include overlaying the first map on the second map, overlaying the second map on the first map, overlaying both the first and second maps on a third map (e.g., as layers on a base map showing general features of an area, such as roads, water, landmarks, geographic or political boundaries, etc.), or generating the map view as one map including the data from both the first and second maps. Each of these and other similar variations on the following method are specifically noted as equivalents to the exemplary method described in further detail, as would be recognized by one of ordinary skill in the art.

At block 416, the remote server may generate a first map including a representation of the vehicle dealer lot or other area of interest within the map area. The first map may include a graphical representation of the vehicle dealer lot as a solid, opaque, outlined, shaded, or otherwise visually defined polygon with the map area. In some embodiments, the representation may include a plurality of such polygons, which may be overlapping. The first map may include additional reference features, such as road or landmarks, some or all of which may be labeled. In some embodiments, one or more rings of fixed radii may be generated and included in the first map. Such rings may be generated concentrically around a point associated with the vehicle dealer lot, such as a center point of the lot. Alternatively, a plurality of rings may be generated around a plurality of points associated with the lot, such as corners of a rectangular lot. These rings may be displayed on the first map to provide a visual indication of distance and to further illustrate to the reviewer the distinction between users located on the lot and users located near the lot but not on the lot. The style of the presentation of the representation of the vehicle dealer lot and any rings or other features of the first map may be customized for the reviewer based upon specific display options included in the request to generation the map view or associated with a reviewer account.

At block 418, the remote server may generate a second map including markers associated with the retrieved geospatial location data. Each marker may be a graphical element placed within the map area to represent a geospatial location within the map area indicated by the retrieved location data (e.g., a pin, an arrow, a flag, a pictographic representation of a person, etc.). In some embodiments, each location data entry may be represented by a separate marker, while other embodiments may combine at least some location data entries into a single marker (e.g., where the location data entries indicate the same or substantially the same location). The markers may be user device markers indicating the determined geospatial locations of the user mobile devices, which may be situated within the map area based upon the retrieved location data. In some embodiments, the markers may include a plurality of distinct visual representations, with each distinct visual representation being used for a plurality of locations. In a preferred embodiment, one style or color of marker may be used to mark locations on a vehicle dealer lot, with a second style or color of marker being used to mark additional locations near (but not on) the vehicle dealer lot. In further embodiments, the second map may include additional data associated with the markers, such as detailed data regarding non-location data (e.g., date, user actions, etc.) corresponding to the marked locations. Such additional data may be visually presented in the second map, or such additional data may be included as non-graphical data available to be accessed by the reviewer when reviewing the map view. The second map may be transparent, aside from the markers or other elements intended to be viewed above the first map. Such markers or other elements may be solid, opaque, or partially opaque, in some embodiments, and may include labels.

At block 420, the remote server may generate the map view by overlaying the second map on the first map. This may include combining the first and second maps. Alternatively, the second map may be added as a layer to the first map. As noted above, both the first and second maps may be added as layers to a third map, such as a general street map of the map area. In some embodiments, the visual representation of one or both of the first and second maps may be adjusted to avoid obscuring important information (e.g., labels, markers, etc.). The remote server may further generate the map view using a map style configuration file or other data indicative of preferred display options. In some embodiments, the remote server may generate the map view as one or more map tiles to be presented to the reviewer via a display of the computing device. Such map tiles may be rectangular segments of the map area that may be combined to form the map view at the computing device. The map tiles may consist of vector graphics files defining various map features. As above, the map tiles may each represent one layer within a part of the map view, or the map tiles may include a plurality of layers flattened into one layer. The generated map view may be generated either by the server or by the computing device.

In some embodiments, the remote server may also generate and send additional report or summary information to be presented to the reviewer in addition to the map view. Such additional report or summary information may include statistics of user locations, visits to a vehicle dealer lot, users near the vehicle dealer lot, or other such statistical summary data derived from the retrieved location data and additional data. If a user location is associated with a user account, the remote server may then access the database to receive previously stored interaction data based upon the user account. The remote server may thus obtain additional data associated with prior user actions based upon a user account identifier (e.g., prior user searches, which may have originated from a separate computing device) to generate the additional report or summary information. For example, the additional report information may include statistics regarding how many visitors to the vehicle dealer lot (i.e., unique user location data entries represented by markers in the map view) had previously viewed a vehicle page or dealer page associated with the vehicle dealer lot within a specified time period prior to visiting the lot (e.g., within a week or within a month of visiting the lot).

At block 422, the remote server may cause the map view to be displayed to the reviewer by a display of the computing device. Causing the map view to be displayed to the reviewer may include sending the map view data to the computing device via the network in response to the reviewer's request. The computing device may then receive, process, and present the map view to the reviewer using a display of the computing device. For example, the computing device may display the map view to the reviewer in a web browser window, along with information related to the map view (e.g., identifying information, indications of parameters, reviewer-selectable filters or display options, etc.). In some embodiments, the presented map view may include one or more selectable options that may further allow the reviewer to customize the map view, such as by applying filters to the data, generating additional summary statistics, or viewing detailed information regarding one or more marked locations. As noted above, this may include the ability to make certain adjustments to the view without requesting additional data from the remote server. For example, the reviewer may hide all markers associated with locations not on the vehicle dealer lot. Other adjustments may require the generation of a new map view by sending a new request to the remote server, such as by selecting a distinct time period for the map view. Once the map view is presented to the reviewer via the computing device, the map generation method 400 may terminate.

Figure 5:
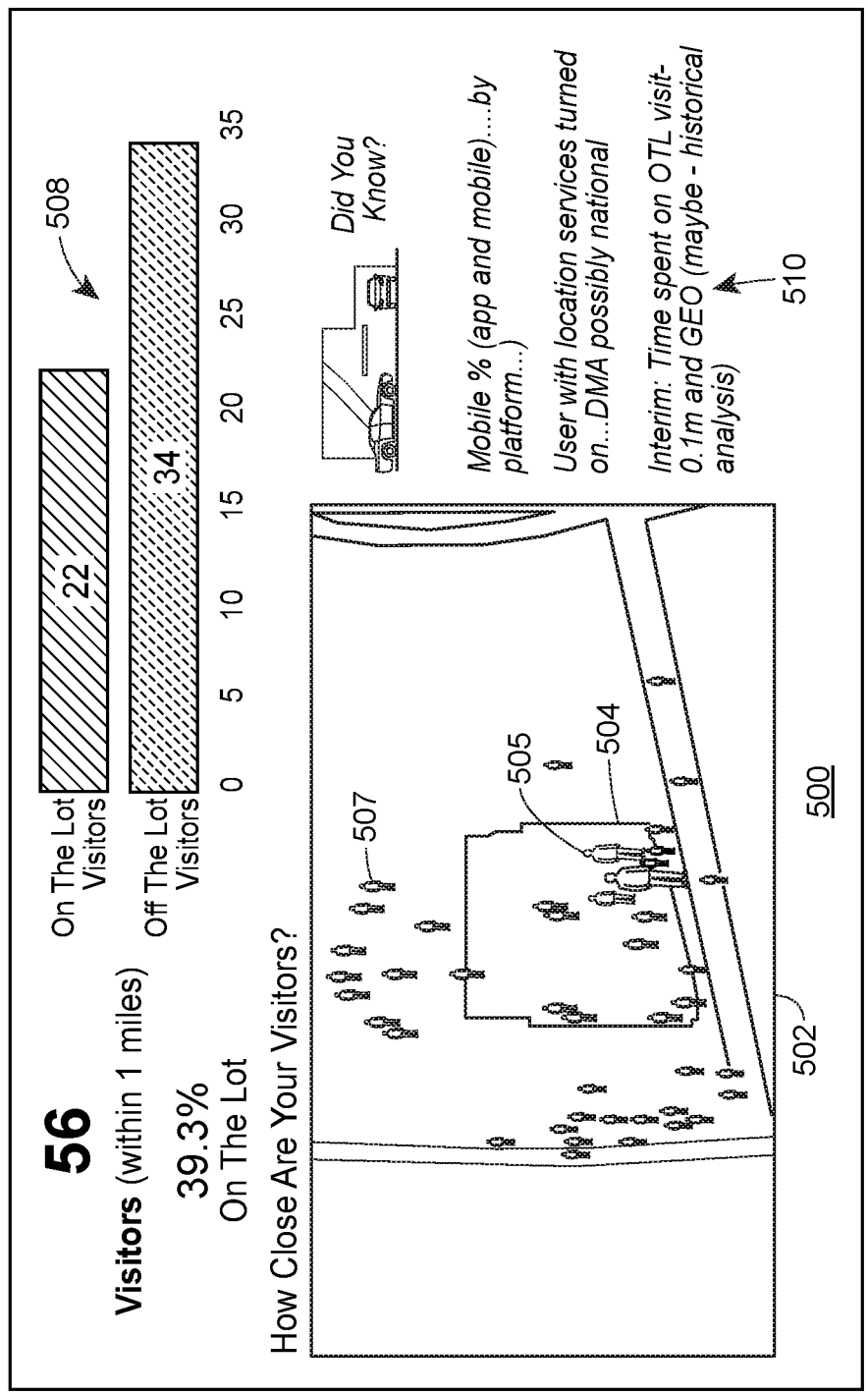
FIG. 5 illustrates an exemplary map view page generated in accordance with the embodiments described herein.

FIG. 5 illustrates an exemplary map view page 500 displaying information regarding a plurality of user locations recorded by user mobile devices over a period of time. The map view page 500 shows a particular example of a map view 502 and report information 508 and 510 that may be generated by the map generation method 400 and displayed to the reviewer via the computing device. The map view page 500 includes a map view 502, which presents a map area including a dealer lot 504 and a plurality of user location markers 505 and 507. The dealer lot 504 is shown as a shaded polygon of irregular shape within the map area. The plurality of user location markers 505 represent user geospatial locations obtained from user mobile devices on the dealer lot 504. The plurality of user location markers 507 represent user geospatial locations obtained from user mobile devices not on the dealer lot 504, but which user geospatial locations are less than a proximity threshold distance away from the dealer lot 504. The location markers 505 are presented using a darker shading or different color than that used for the location markers 507, which allows the reviewer to easily distinguish between locations on and off the dealer lot 504. In addition to the map view 502, the exemplary map view page 500 also includes two report information sections 508 and 510. The report information 508 presents statistics regarding the total visitors (i.e., user locations within 0.1 miles), number of visitors on and the lot, number of visitors off the lot (but within 0.1 miles), and a percentage of the total visitors that were on the lot. The report information 510 provides additional statistical summary data regarding user mobile device platforms, use of location services on user mobile devices, and time spent on the lot by users. The map view page 500 is exemplary only, and other configurations or views including additional, alternative, or less information or presenting such information in another manner may be generated and displayed in accordance with the methods described herein.

Figure 6:
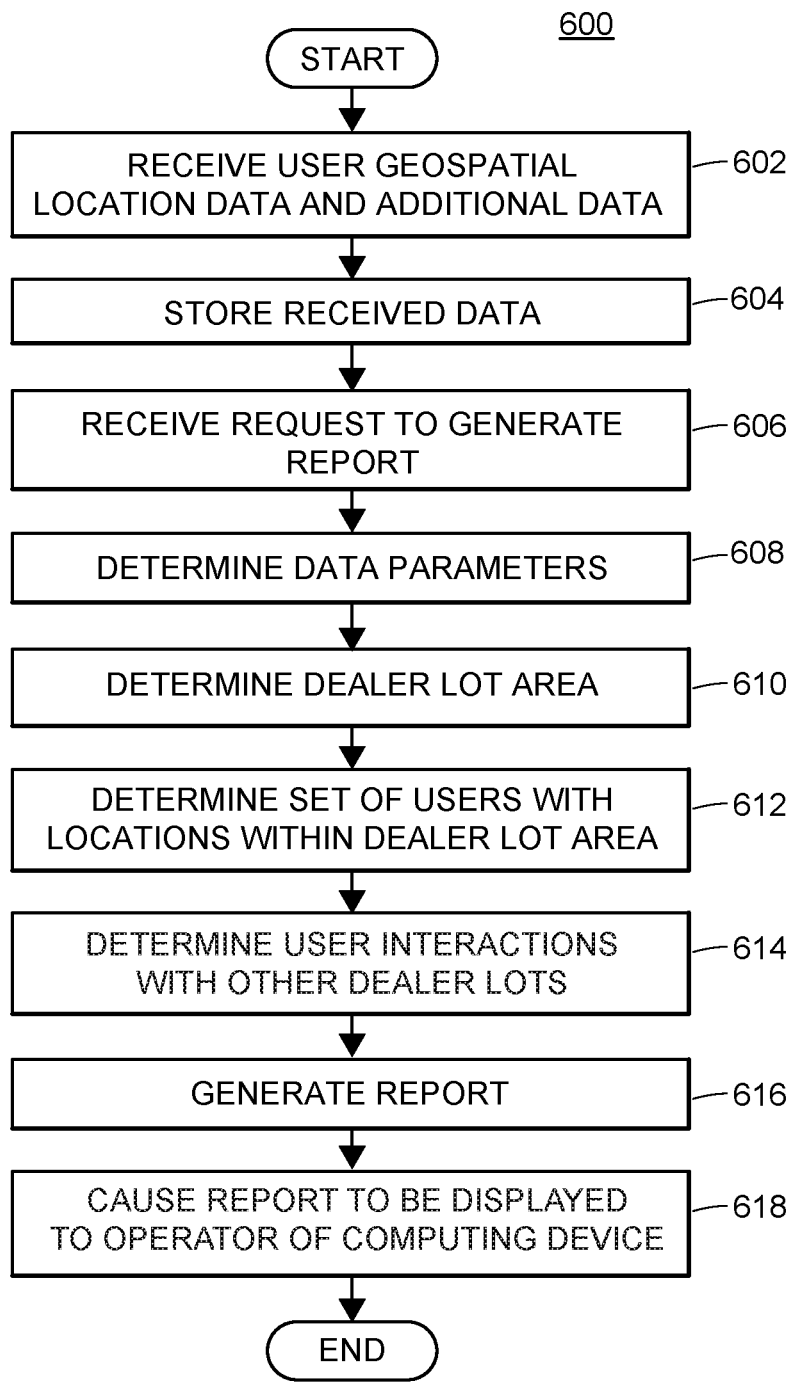
FIG. 6 illustrates a flow diagram of an exemplary report generation method in accordance with the embodiments described herein.

FIG. 6 illustrates a flow diagram of an exemplary report generation method 600 for generating a report based upon geospatial location data received from one or more user mobile devices. The method 600 may be implemented by one or more remote servers, such as the server 140, to receive messages from a plurality of user mobile devices implementing the data method 300 described above and to store the received data in a memory, such as the database 146. As previously noted, the user mobile devices may be mobile computing devices 110, which may communicate with the remote server via the network 130. The report may present information regarding user activity for one or more users, which may include a map view associated with user actions. For example, the locations of vehicles or vehicle dealers viewed by users may be mapped. Such locations may be determined for a specified set of users, such as users associated with geospatial location data on a selected vehicle dealer lot based upon polygon map data representing the lot. Such polygonal map data may be of the sort described above. Once generated, the report may be presented to a reviewer (e.g., a dealer representative). For example, the reviewer may receive a report including a map view and a summary of other dealers that were searched by the users interacting with the user mobile devices while on a dealer lot associated with the reviewer. The reviewer may be an operator of a computing device, such as the computing device 114, which may receive the map view from the remote server via the network.

The report generation method 600 may begin by receiving geospatial location data and additional data at the remote server from one or more user mobile devices (block 602), which received data may be stored in a database or other memory associated with the remote server (block 604). Upon receiving a request to generate a report (block 606), the remote server may determine the parameters of the report based upon the request (block 608), identify a dealer lot area based upon the parameters (block 610), and identify a set of users having stored user location data entries associated with the identified dealer lot (block 612). The remote server may then determine one or more user actions involving other dealer lots for the set of identified users (block 614), which may include user actions of requesting or viewing data regarding the other dealer lots via the user mobile device while on the identified dealer lot. The remote server may then generate a map view for the report (block 616), which may include markers indicating user interactions with other dealer lots. The report may then be generated and communicated via the network to a computing device for review by a reviewer (i.e., an operator of the computing device) (block 618).

At block 602, the remote server may receive geospatial location data and additional data from one or more user mobile devices via the network, as discussed above with respect to the method 400. The additional data may particularly include data relating to user actions with respect to vehicle dealer lots, such as viewing information regarding a vehicle or vehicle dealer associated with the vehicle dealer lot.

At block 604, the remote server may store the received geospatial location data and additional data received in a memory associated with the remote server, as discussed above with respect to the method 400. In addition to storing the received location and additional data in the database 146, as described above, the remote server may associate each received data entry with a user identifier. Such user identifier may be used to later generate sets of users and user data across multiple user sessions. For example, user location and additional data may be obtained for a plurality of locations visited at separate times by the same user, which may all be associated by a common user identifier indicating the user. The user identifier may be an account identifier (account ID), an identifier associated with the user mobile device (such as a unique device identifier, user mobile network account identifier, or data stored in a tracking cookie on the user mobile device), or other identifier specifying the user or user mobile device. By identifying the stored data, user actions across a period of time may be compared and presented in a report to the reviewer.

At block 606, the remote server may receive a request to generate a report from the reviewer. The request may be received from a computing device via the network, and the request may include indications of parameters of the report. For example, the request may indicate whether a map view should be generated for one or more locations or dealer lots, as well as a relevant area around such locations or lots (e.g., a radius around a point associated with a dealer lot). The indications of the parameters may further specify a time period of interest, user actions of interest, whether to include user locations near but not on a dealer lot, or other details that may be used to filter or query the stored data. For example, the indications of the parameters may specify a time period or an area of interest for user actions with other dealer lots, such as a county or region of a state. In some embodiments, the indications of the parameters may include predetermined sets of parameters, which may be general or customized (e.g., monthly or annual reports for vehicle dealers). In further embodiments, the request may further specify display options, such as a style or color scheme or dashboard data to present to the reviewer.

At block 608, the remote server may determine one or more data parameters from the received request. The data parameters may be used by the remote server to filter, query, or otherwise select location and additional data for the report to be generated. The data parameters may indicate data of interest for the report, such as types of user actions of interest or summary data to be included in the report. The remote server may extract parameters from the request by parsing the request and, in some instances, interpreting the received indications of the parameters included in the request. In some embodiments, the remote server may determine default parameters if the request does not include an indication of one or more required parameters. For example, the remote server may determine a location or vehicle dealer lot parameter based upon information associated with a user account associated with the request. As another example, a default timeframe for the report data may be set at one month. In further embodiments, the remote server may obtain missing parameters by causing one or more requests for parameter selection or input to be presented to the reviewer by the computing device.

At block 610, the remote server may identify a dealer lot area based upon the data parameters. In some embodiments, the dealer lot area may include an area around a point representing a dealer lot (e.g., a circular area defined by a radius and geospatial coordinates for a point within the dealer lot). In preferred embodiments, the dealer lot area may be identified as one or more polygonal map areas representing the dealer lot, as described above. The remote server may identify the dealer lot area by determining a dealer lot from the parameters, then obtaining polygon map data associated with the dealer lot from a database storing such data for a plurality of dealer lots. In some embodiments, a plurality of dealer lot areas may be determined, such as a first map area representing the dealer lot as one or more polygons and a second area representing an area around the dealer lot by a circular area of specified radius around a point. In such embodiments, the server may thus be enabled to generate reports that distinguish between user locations on a dealer lot from those near the dealer lot.

At block 612, the remote server may identify a set of users having at least one location data entry within the dealer lot area. Such location data entries may be identified by comparing location data entries in the database against the identified one or more dealer lot areas to determine whether each location data entry is within the dealer lot area. In some embodiments, this may include multiple comparisons to first obtain a preliminary set of entries that are within an area of interest that includes the dealer lot area, but which also includes an additional non-lot area. Such preliminary set of entries may be quickly identified by querying the database based on a latitude range and a longitude range, for example, to quickly remove entries that are easily identified as being not within the dealer lot area. Comparing the location data entries to the dealer lot areas may include performing one or more calculations to determine whether the location data indicates a geospatial location that is within an application polygon or is within a radial distance of a point associated with the dealer lot. Particularly where the dealer lot is represented by one or more complex polygons (i.e., irregular polygons having many sides oriented at a multitude of angles), the computations to determine whether a location data entry may place a relatively high computational burden on the processors of the remote server. Thus, in some embodiments, the user location data entries may be compared against each of a plurality of dealer lots in advance of receipt of the request to generate the report. In such embodiments, indicators may be added to the user location data entries to indicate whether the entries are located within dealer lots, such as by adding entries with an additional field in the database. The remote server may create a set of all location data entries identified as being within the dealer lot area, which set may be stored in temporary memory of the remote server. The remote server may further identify all unique users from the identified set of location data entries, which may similarly be stored in temporary memory, such as in a temporary table.

At block 614, the remote server may determine actions of the identified users associated with one or more other dealer lots (i.e., dealer lots, excluding the identified dealer lot). The remote server may identify user data entries matching the data parameters regarding user actions for the identified users. For example, the remote server may identify entries with user actions associated with other dealer lots within fifty miles of the identified dealer lot and occurring within the month preceding the request. The user actions associated with the other dealer lots may include requesting data associated with the other dealer lots (e.g., searching vehicles located at the other dealer lots, viewing VDPs or DPPs associated with the other dealer lots, etc.) or visiting other dealer lots (e.g., as indicated by user location data of the users). For example, a user may visit the identified dealer lot area. Either while on the identified dealer lot or at another time, the same user may view information regarding a vehicle located at another dealer lot via the user mobile device. The same user may likewise visit one of the other dealer lots, at which time user geospatial location data may be generated by the user mobile device and stored by the remote server. Similar to the method described above, visits to other dealer lots may be determined based upon proximity to a point representing other dealer lots or based upon polygon map data representing the other dealer lots. Thus, the user actions may include viewing data regarding the other dealer lots, as well as visiting other dealer lots. In alternative embodiments, the remote server may limit the determination of user actions to user data associated with locations identified as being within the dealer lot area (e.g., users viewing data associated with other dealer lots while on the identified dealer lot), or the remote server may include user actions not associated with locations identified as being within the dealer lot area (e.g., users visiting other dealer lots). The user actions determined by the remote server from the database of user location and additional data may be specified or limited by the data parameters. For example, the parameters may specify particular other dealer lots of interest, particular types of user actions of interest, or time periods of interest to search. The remote server may generate a data set of information to be used for the report based upon the determined user actions for the identified set of users.

At block 616, the remote server may generate the requested report data based upon the data set generated as discussed above. The report may include detailed or summary report data regarding the user visits to the identified dealer lot area for a period of time, the user actions associated with the other dealer lots, and the other dealer lots. For example, summary statistics regarding visits to or views of information for each of the other dealer lots by users who visited the identified dealer lot area may be included in the report. In some embodiments, the report may include a map view indicating the locations of the other dealer lots associated with the user actions. In further embodiments, the report data may include map data regarding individual user interactions with other vehicle lots or user locations associated with interactions with other dealer lots. The map view and other report data may be generated in a manner similar to that described elsewhere herein. For example, the remote server may generate a map including markers representing other dealer lots associated with user actions, representing user visits to the other dealer lots, or other relevant locations.

At block 618, the remote server may cause the report to be displayed to the reviewer at the computing device. Causing the report to be displayed to the reviewer may include sending the report data to the computing device via the network in response to the reviewer's request. The computing device may then receive, process, and present the report (including any map view) to the reviewer using a display of the computing device, as described elsewhere herein. Once the report is presented to the reviewer via the computing device, the report generation method 600 may terminate.

Figure 7:
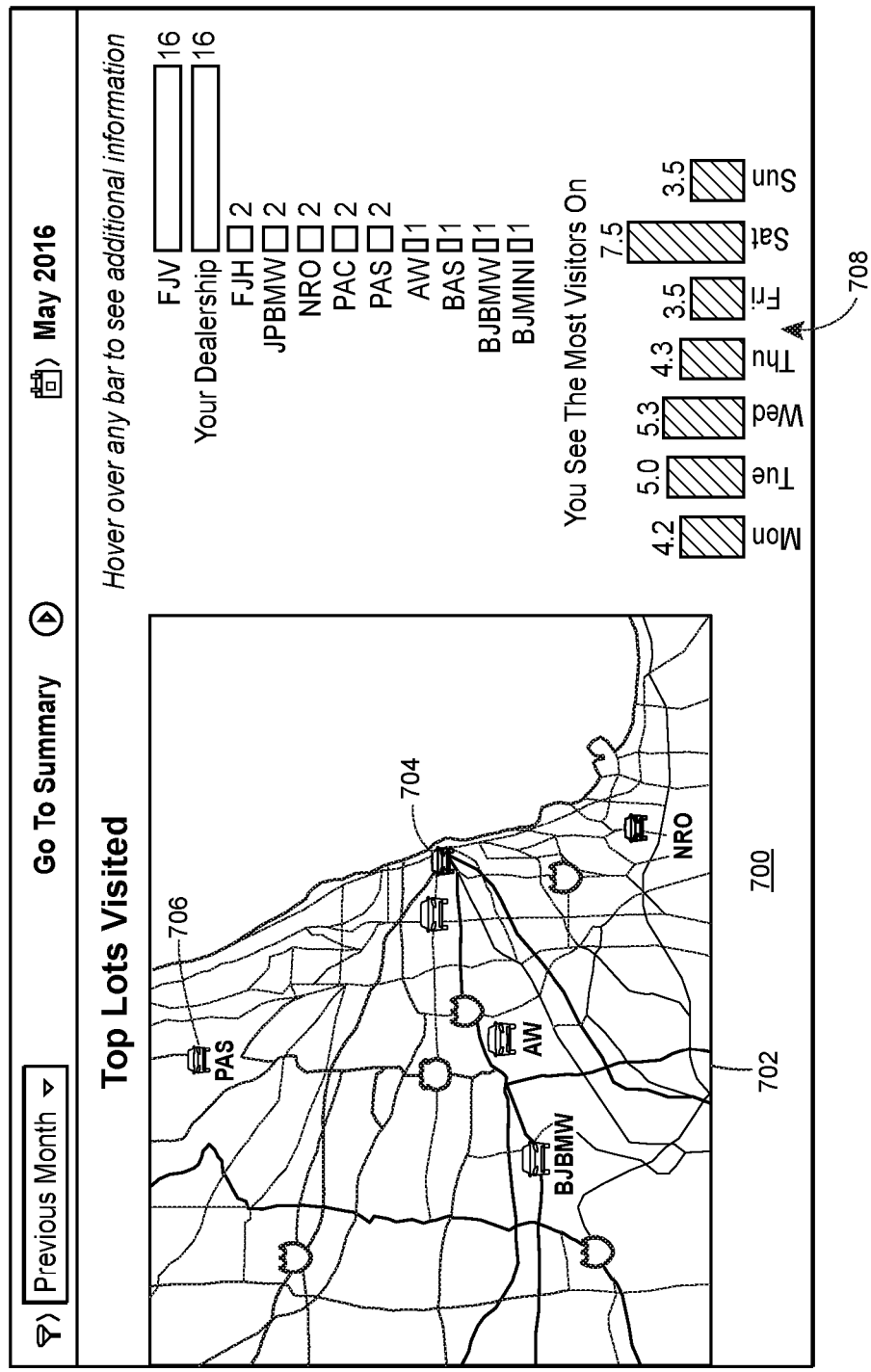
FIG. 7 illustrates an exemplary report generated in accordance with the embodiments described herein.

FIG. 7 illustrates an exemplary report 700 displaying information regarding a plurality of user visits to other dealer lots over a period of time. The report 700 includes a map view 702 and a report information section 708. The map view shows the identified dealer lot 704, as well as a plurality of other dealer lots 706 within a map area. As illustrated in the report 700, not all other dealer lots visited by users are marked within the map area. Instead, only the other dealer lots 706 with the most user visits are represented by markers within the map view 702. The report information section 708 includes further details regarding the number of user visits to the identified dealer lot area and to each of the other dealer lots. The exemplary report information section 708 also includes a summary of user visits, showing average user visits for day of the week. Of course, other data may be included in similar reports in addition to, or as an alternative to, the data presented in the exemplary report 700.

Other Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Although the foregoing text sets forth a detailed description of numerous different embodiments, it should be understood that the legal scope of the invention is defined by the words of the claims set forth at the end of this patent. The particular features, structures, or characteristics of any specific embodiment may be combined in any suitable manner and in any suitable combination with one or more other embodiments, including the use of selected features without corresponding use of other features. It is to be understood that other variations and modifications of the embodiments of the present invention described and illustrated herein are possible in light of the teachings herein and are to be considered part of the spirit and scope of the present invention. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

What is claimed is:

1. A computer-implemented method for generating customized responses based upon user location information, comprising:

receiving, at a user mobile device, a request from a user for information associated with one or more vehicles or vehicle dealers;

obtaining, by a geolocation unit of the user mobile device, a geospatial location identifier of the user mobile device identifying a geospatial location of the user mobile device at a time associated with the request;

transmitting, from the user mobile device to a server via a communication network, the geospatial location identifier and an indication of the request;

receiving, at the server via the communication network, the geospatial location identifier and the indication of the request from the user;

accessing, by one or more processors of the server, map data associated with a vehicle dealer lot in proximity to the identified geospatial location of the user mobile device, the map data including a set of data defining a lot area of the vehicle dealer lot as one or more polygons within a map area;

determining, by one or more processors of the server, that the user mobile device is located on the vehicle dealer lot by comparing the geospatial location identifier with the lot area;

determining, by one or more processors of the server, a user interest associated with the vehicle dealer lot based upon the geospatial location of the user mobile device on the vehicle dealer lot and the received indication of the request;

determining, by one or more processors of the server, a response based upon the determined user interest; and causing, by one or more processors of the server, the determined response to be implemented.

2. The computer-implemented method of claim 1, wherein:

determining the response includes determining to generate a report including information associated with the determined user interest and at least one of (i) one or more additional user interactions with the user mobile device or (ii) one or more additional geospatial location identifiers associated with the user mobile device; and causing the determined response to be implemented includes (i) generating the report and (ii) transmitting the generated report to a computing device for presentation to a reviewer.

3. The computer-implemented method of claim 2, wherein generating the report includes generating a map indicating the geospatial location of the user mobile device on the vehicle dealer lot.

4. The computer-implemented method of claim 1, wherein:

determining the response includes determining additional information to provide to the user in response to the received indication of the request; and causing the determined response to be implemented includes transmitting the additional information to the user mobile device for presentation to the user.

5. The computer-implemented method of claim 4, wherein determining the additional information to provide to the user includes determining additional information regarding a vehicle.

6. The computer-implemented method of claim 1, further comprising:

obtaining, by the geolocation unit of the user mobile device, a plurality of additional geospatial location identifiers from the user mobile device identifying a plurality of additional geospatial locations of the user mobile device;

transmitting, from the user mobile device to the server via the communication network, the plurality of additional geospatial location identifiers; and determining, by one or more processors of the server, a length of time spent by the user at the geospatial location on the vehicle dealer lot based upon the plurality of additional geospatial location identifiers, wherein determining the user interest further includes determining the user interest based upon the determined length of time spent by the user at the geospatial location on the vehicle dealer lot.

7. The computer-implemented method of claim 1, wherein the request from the user for the information associated with the one or more vehicles or vehicle dealers includes an interaction of the user with a vehicle information application on the user mobile device.

8. The computer-implemented method of claim 1, wherein obtaining the geospatial location identifier includes determining the geospatial location identifier as a Global Positioning System (GPS) coordinate using a GPS unit of the user mobile device.

9. A computer system for generating customized responses based upon user location information, comprising:
   one or more processors;
   a communication module adapted to communicate data via a network;
   a program memory coupled to the one or more processors and storing executable instructions that, when executed by the one or more processors, cause the computer system to:
      receive an indication of a request from a user for information associated with one or more vehicles or vehicle dealers from a user mobile device via the communication module;
      obtain a geospatial location identifier of the user mobile device identifying a geospatial location of the user mobile device at a time associated with the request via the communication module, wherein the geospatial location identifier is generated by the user mobile device;
      access map data associated with a vehicle dealer lot in proximity to the identified geospatial location of the user mobile device, the map data including a set of data defining a lot area of the vehicle dealer lot as one or more polygons within a map area;
      determine that the user mobile device is located on the vehicle dealer lot by comparing the geospatial location identifier with the lot area;
      determine a user interest associated with the vehicle dealer lot based upon the geospatial location of the user mobile device on the vehicle dealer lot and the received indication of the request from the user;
      determine a response based upon the determined user interest; and
      cause the determined response to be implemented.

10. The computer system of claim 9, wherein:
   the executable instructions that cause the computer system to determine the response further cause the computer system to determine to generate a report including information associated with the determined user interest and at least one of (i) one or more additional user interactions with the user mobile device or (ii) one or more additional geospatial location identifiers associated with the user mobile device; and
   the executable instructions that cause the computer system to cause the determined response to be implemented further cause the computer system to (i) generate the report and (ii) transmit the generated report to a computing device via the communication module for presentation to a reviewer.

11. The computer system of claim 10, wherein the executable instructions that cause the computer system to generate the report further cause the computer system to generate a map indicating the geospatial location of the user mobile device on the vehicle dealer lot.

12. The computer system of claim 9, wherein:
   the executable instructions that cause the computer system to determine the response further cause the computer system to determine additional information to provide to the user in response to the received indication of the request; and
   the executable instructions that cause the computer system to cause the determined response to be implemented further cause the computer system to transmit the additional information to the user mobile device via the communication module for presentation to the user.

13. The computer system of claim 12, wherein the executable instructions that cause the computer system to determine the additional information to provide to the user further cause the computer system to determine additional information regarding a vehicle.

14. The computer system of claim 9, wherein the executable instructions further cause the computer system to:
   obtain a plurality of additional geospatial location identifiers from the user mobile device identifying a plurality of additional geospatial locations of the user mobile device via the communication module, wherein the plurality of additional geospatial location identifiers are generated by the user mobile device; and
   determine a length of time spent by the user at the geospatial location on the vehicle dealer lot based upon the plurality of additional geospatial location identifiers,
   wherein determining the user interest further includes determining the user interest based upon the determined length of time spent by the user at the geospatial location on the vehicle dealer lot.

15. A tangible, non-transitory computer-readable medium storing instructions for generating customized responses based upon user location information that, when executed by one or more processors of a computer system, cause the computer system to:
   receive an indication of a request from a user for information associated with one or more vehicles or vehicle dealers from a user mobile device;
   obtain a geospatial location identifier of the user mobile device identifying a geospatial location of the user mobile device at a time associated with the request, wherein the geospatial location identifier is generated by the user mobile device;
   access map data associated with a vehicle dealer lot in proximity to the identified geospatial location of the user mobile device, the map data including a set of data defining a lot area of the vehicle dealer lot as one or more polygons within a map area;
   determine that the user mobile device is located on the vehicle dealer lot by comparing the geospatial location identifier with the lot area;
   determine a user interest associated with the vehicle dealer lot based upon the geospatial location of the user mobile device on the vehicle dealer lot and the received indication of the request from the user;
   determine a response based upon the determined user interest; and
   cause the determined response to be implemented.

16. The tangible, non-transitory computer-readable medium of claim 15, wherein:
   the executable instructions that cause the computer system to determine the response further cause the computer system to determine to generate a report including information associated with the determined user interest and at least one of (i) one or more additional user interactions with the user mobile device or (ii) one or more additional geospatial location identifiers associated with the user mobile device; and
   the executable instructions that cause the computer system to cause the determined response to be implemented further cause the computer system to (i) generate the report and (ii) transmit the generated report to a computing device for presentation to a reviewer.

17. The tangible, non-transitory computer-readable medium of claim 16, wherein the executable instructions that cause the computer system to generate the report further cause the computer system to generate a map indicating the geospatial location of the user mobile device on the vehicle dealer lot.

18. The tangible, non-transitory computer-readable medium of claim 15, wherein:
- the executable instructions that cause the computer system to determine the response further cause the computer system to determine additional information to provide to the user in response to the received indication of the request; and
- the executable instructions that cause the computer system to cause the determined response to be implemented further cause the computer system to transmit the additional information to the user mobile device for presentation to the user.

19. The tangible, non-transitory computer-readable medium of claim 18, wherein the executable instructions that cause the computer system to determine the additional information to provide to the user further cause the computer system to determine additional information regarding a vehicle.

20. The tangible, non-transitory computer-readable medium of claim 15, wherein the executable instructions further cause the computer system to:
- obtain a plurality of additional geospatial location identifiers from the user mobile device identifying a plurality of additional geospatial locations of the user mobile device, wherein the plurality of additional geospatial location identifiers are generated by the user mobile device; and
- determine a length of time spent by the user at the geospatial location on the vehicle dealer lot based upon the plurality of additional geospatial location identifiers, wherein determining the user interest further includes determining the user interest based upon the determined length of time spent by the user at the geospatial location on the vehicle dealer lot.

* * * * *